UNITED STATES PATENT OFFICE.

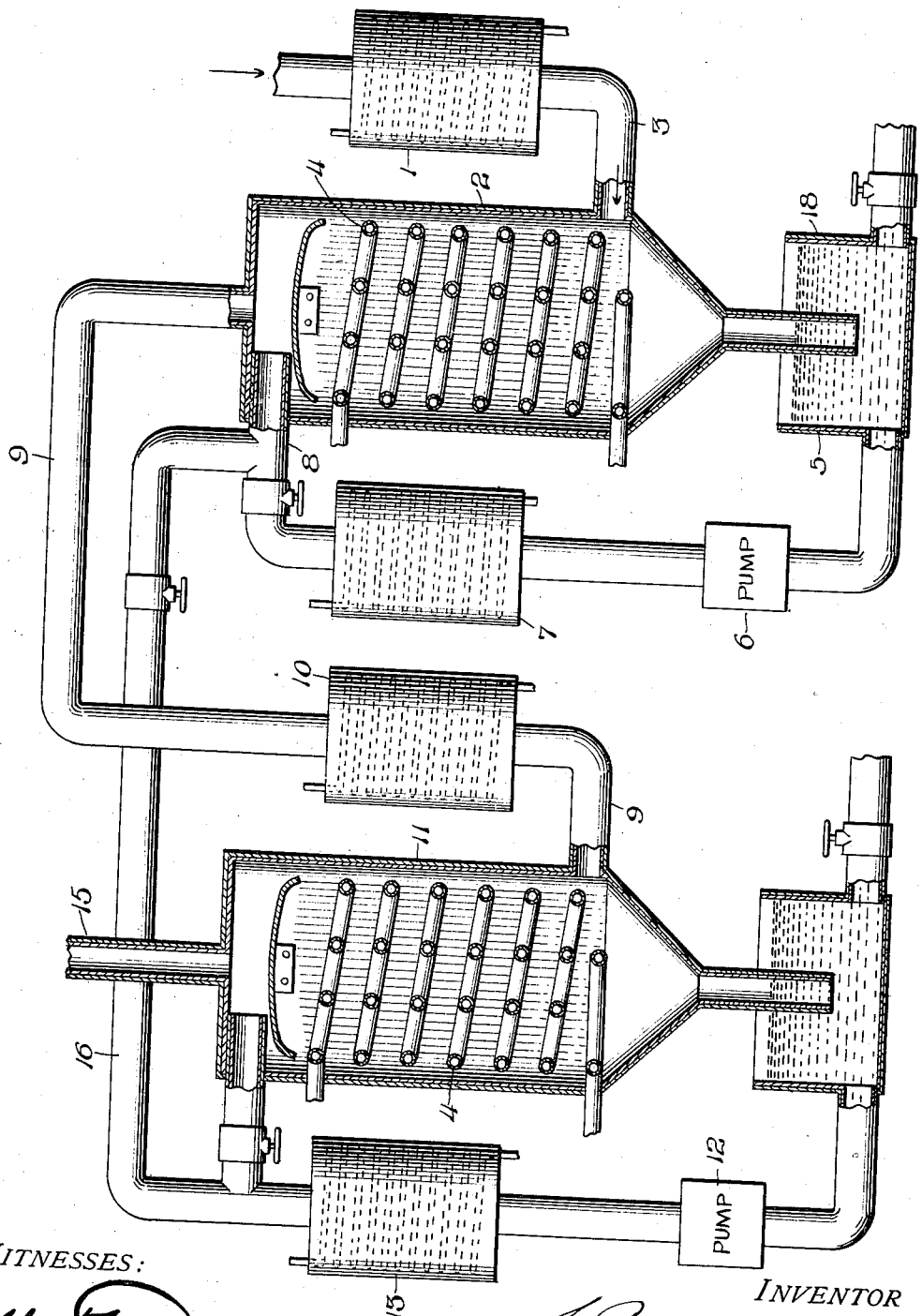

SAMUEL PEACOCK, OF CHICAGO, ILLINOIS, ASSIGNOR TO AMERICAN CYANAMID COMPANY, OF NEW YORK, N. Y., A CORPORATION OF MAINE.

PROCESS OF MAKING DI-AMMONIUM PHOSPHATE.

995,898.          Specification of Letters Patent.    Patented June 20, 1911.

Application filed September 2, 1909. Serial No. 515,805.

*To all whom it may concern:*

Be it known that I, SAMUEL PEACOCK, a citizen of the United States, residing at Chicago, in the county of Cook and State of Illinois, have invented certain new and useful Improvements in Processes of Making Di-ammonium Phosphate from Ammonia and Phosphoric Acid; and I do hereby declare the following to be a full, clear, and exact description of the invention, such as will enable others skilled in the art to which it appertains to make and use the same.

This invention relates to a process for making secondary or di-ammonium phosphate, $(NH_4)_2HPO_4$, from ammonia and phosphoric acid; and, has for its object to produce a simple and comparatively cheap process for making in a single operation, substantially pure commercial secondary ammonium phosphate, that is more uniform and constant in composition than the products now ordinarily sold.

To this end the invention consists in the novel steps and combinations of steps constituting my process, more fully hereinafter disclosed, and particularly pointed out in the claims.

Referring to the accompanying drawing forming a part of this specification, in which the figure is a diagrammatic view of an apparatus embodying the principles of my invention 1 represents any suitable cooling means for the ammonia gases which enter the absorption system.

In order to produce secondary or di-ammonium phosphate free of the primary or mono-ammonium phosphate, by direct combination of a solution of phosphoric acid and cooled ammonia gas, it is necessary to keep the temperature of the solution below 80 degrees centigrade. This I accomplish by passing the ammonia gases, previously cooled by means of the coil 1 through the pipe 3, into the tower 2, provided with any suitable cooling means as the coils 4. The phosphoric acid may be placed initially in the tanks 18, and after the operation has been started the phosphoric acid solution 5 from the discharge of the absorption tower 2, is forced by means of the pump 6 continuously through any suitable cooling means 7, and through the valved pipe 8, back to the top of the tower 2, where it may be passed over the cooling coils 4, and there absorb the ammonia gases entering through the pipe 3.

The unabsorbed gases may be led out of the top of the tower 2, by means of the pipe 9, through a second cooling means 10, and into a second tower 11, provided with a circulating pump 12, and cooling means 13 for the phosphoric acid solution. As many towers, cooling coils and pumps may be employed as desired, and the final unabsorbed gases may be permitted to escape from the last tower by means of the flue 15. The valved pipe 16 connects all the pump circuits in order that should one tower become unduly heated, a cooler solution may at once be supplied from another tower. The circulation of the phosphoric acid solution is continued until a measured quantity of phosphoric acid has neutralized an equivalent quantity of ammonia, for the formation of secondary ammonium phosphate. The total solution from the absorption system is then drawn from the tank 18, and evaporated at, or a few degrees below, 80° C. to the density of crystallization in a vacuum pan using a vacuum not exceeding 350 millimeters of mercury. The specific gravity of the solution and therefore the size of the crystals to be obtained will be determined by the use to which the salt is to be put. Generally, speaking, for commercial purposes large crystals are desired and these may be produced by employing relatively weaker solutions, thereby causing a slow formation of the crystals. If a higher specific gravity of the solution is employed, the crystals are precipitated faster but are smaller. The purpose of thus concentrating the product to the density of crystallization is therefore to effect a separation of the di-ammonium phosphate in that solid form which is most desirable for commerce. Further, it will be observed by keeping the temperature at or below 80° C. that no mono-ammonium phosphate or tri-ammonium phosphate is formed in the liquor, which would not be the case if the solution was permitted to rise to say 10° above or fall to say 20° below 80° C. It, therefore, follows since no mono-ammonium phosphate nor tri-ammonium phosphate is present in the liquor, that the crystals produced are entirely free from the said other salts which would not be the case if these said salts were allowed in the first place to form in the solution. In other words, it is evident that it would be impossible to precipitate di-ammonium phosphate in the presence of other salts without also carrying down some of said other salts admixed with the said di-ammonium phosphate.

As is well known, ammonium salts are sold on a guaranteed percentage of ammonia, and are subject to strict State laws. If the commercial product is not of a uniform chemical composition the appraisement is governed by the ammonia content ($NH_3$) of the lowest grade salt the product contains. Therefore it is of great commercial importance to produce the secondary salts as free as possible from the primary salts.

Of course it will be understood that those skilled in the art may vary the details of my process without departing from the spirit thereof, and therefore I do not wish to be limited to the exact minor features set forth, except as may be required by the claims.

What I claim is:—

1. The process of producing di-ammonium phosphate $(NH_4)_2HPO_4$ substantially free from mono-ammonium phosphate $NH_4H_2PO_4$, which consists in passing ammonia and phosphoric acid into a suitable chamber; and in causing the same to react in the presence of water at a temperature too low to permit the formation of the primary salt and in suitably concentrating the solution thus formed under a pressure below that of the atmosphere, substantially as described.

2. The process of producing di-ammonium phosphate substantially free from mono-ammonium phosphate, which consists in passing ammonia and phosphoric acid into a suitable chamber; in causing the same to react in the presence of water at a temperature too low to permit the formation of the primary salt; in passing the unabsorbed gases into a second chamber and there causing them to react in the presence of water; and in passing the solution from said second chamber into said first chamber and in suitably concentrating the solution thus formed under a pressure below that of the atmosphere, substantially as described.

3. The process of producing di-ammonium phosphate substantially free from mono-ammonium phosphate which consists in passing ammonia and phosphoric acid fumes into a suitable chamber; in causing the same to react in the presence of water, the temperature of which is maintained at a point too low to permit the formation of the primary salt; in passing the unabsorbed gases into a second chamber and causing them to react in the presence of water; and in constantly circulating the water solutions through said chambers and in suitably concentrating the solution thus formed under a pressure below that of the atmosphere, substantially as described.

4. The process of producing di-ammonium phosphate substantially free from mono-ammonium phosphate which consists in passing ammonia and phosphoric acid fumes into a suitable chamber, in causing the same to react in the presence of water the temperature of which is maintained through cooling means at a point too low to permit the formation of the primary salt; in passing the unabsorbed gases into a second chamber and causing them to react in the presence of water; in passing the solution containing the secondary salt from the second chamber into the first; and in constantly circulating the water solutions through said chambers and in suitably concentrating the solution thus formed under a pressure below that of the atmosphere, substantially as described.

5. The process of producing di-ammonium phosphate substantially free from mono-ammonium phosphate which consists in passing ammonia and phosphoric acid fumes through a series of chambers; in circulating water solutions of ammonium phosphate through said chambers; in maintaining the temperature in the first chamber at a point too low to permit the primary salt to form; in passing the solution from the other chambers into said first mentioned chamber and in suitably concentrating the solution thus formed under a pressure below that of the atmosphere; and in recovering the secondary salt thus produced, substantially as described.

In testimony whereof, I affix my signature, in presence of two witnesses.

SAMUEL PEACOCK.

Witnesses:
T. A. WITHERSPOON,
GEO. B. PITTS.